US012054917B2

(12) United States Patent
Kang

(10) Patent No.: US 12,054,917 B2
(45) Date of Patent: Aug. 6, 2024

(54) CONSTRUCTION MACHINE

(71) Applicant: HD HYUNDAI INFRACORE CO., LTD., Incheon (KR)

(72) Inventor: Byungil Kang, Incheon (KR)

(73) Assignee: HD HYUNDAI INFRACORE CO., LTD., Incheon (KR)

( * ) Notice: Subject to any disclaimer, the term of this patent is extended or adjusted under 35 U.S.C. 154(b) by 0 days.

(21) Appl. No.: 17/802,351

(22) PCT Filed: Feb. 26, 2021

(86) PCT No.: PCT/KR2021/002445
§ 371 (c)(1),
(2) Date: Aug. 25, 2022

(87) PCT Pub. No.: WO2021/172927
PCT Pub. Date: Sep. 2, 2021

(65) Prior Publication Data
US 2023/0096479 A1 Mar. 30, 2023

(30) Foreign Application Priority Data
Feb. 27, 2020 (KR) ........................ 10-2020-0024504

(51) Int. Cl.
*E02F 9/22* (2006.01)
*F15B 1/02* (2006.01)
(Continued)

(52) U.S. Cl.
CPC .......... *E02F 9/2221* (2013.01); *E02F 9/2217* (2013.01); *E02F 9/2242* (2013.01);
(Continued)

(58) Field of Classification Search
CPC ...... F15B 1/024; F15B 11/163; F15B 11/165; F15B 11/17; F15B 21/14; E02F 9/2217;
(Continued)

(56) References Cited

U.S. PATENT DOCUMENTS 4,369,625 A * 1/1983 Izumi .................... E02F 9/2242 414/699
8,984,875 B2 * 3/2015 Jang ...................... E02F 9/2239 60/429
(Continued)

FOREIGN PATENT DOCUMENTS

CN 107420357 A 12/2017
CN 108729492 A 11/2018
(Continued)

OTHER PUBLICATIONS

Office Action for related Chinese Application No. 202180017098.X; action dated May 25, 2023; (10 pages).
(Continued)

*Primary Examiner* — Michael Leslie
(74) *Attorney, Agent, or Firm* — K&L Gates LLP

(57) ABSTRACT

Provided is a construction machine. The construction machine includes a boom cylinder driving a boom, a rotation motor rotating a rotary body, an arm cylinder driving an arm, a bucket cylinder driving a bucket, a first main pump supplying working fluid to the boom cylinder and discharging the working fluid in opposite directions, a second main pump supplying working fluid to the rotation motor and discharging the working fluid in opposite directions, and a third main pump supplying working fluid to the arm cylinder or the bucket cylinder.

11 Claims, 11 Drawing Sheets

(51) Int. Cl.
*F15B 11/17* (2006.01)
*F15B 21/14* (2006.01)

(52) U.S. Cl.
CPC .......... *E02F 9/2267* (2013.01); *E02F 9/2289* (2013.01); *E02F 9/2292* (2013.01); *E02F 9/2296* (2013.01); *F15B 1/024* (2013.01); *F15B 11/17* (2013.01); *F15B 21/14* (2013.01); *F15B 2211/20523* (2013.01); *F15B 2211/20546* (2013.01); *F15B 2211/20561* (2013.01); *F15B 2211/20576* (2013.01); *F15B 2211/7135* (2013.01); *F15B 2211/7142* (2013.01); *F15B 2211/88* (2013.01)

(58) Field of Classification Search
CPC ..... E02F 9/2239; E02F 9/2246; E02F 9/2289; E02F 9/2292; E02F 9/2296
See application file for complete search history.

(56) References Cited

U.S. PATENT DOCUMENTS

| | | | | |
|---|---|---|---|---|
| 9,068,578 | B2 * | 6/2015 | Opdenbosch | F15B 13/06 |
| 9,903,094 | B2 * | 2/2018 | Takahashi | E02F 9/2207 |
| 9,938,691 | B2 * | 4/2018 | Hiraku | F15B 7/06 |
| 10,161,423 | B2 * | 12/2018 | Rampen | F15B 11/162 |
| 10,415,215 | B2 * | 9/2019 | Takahashi | E02F 9/2235 |
| 11,111,651 | B2 * | 9/2021 | Shimizu | F15B 11/17 |
| 2013/0098012 | A1 | 4/2013 | Opdenbosch | |
| 2013/0312399 | A1 * | 11/2013 | Hiraku | E02F 9/2217 60/422 |
| 2016/0348335 | A1 | 12/2016 | Kondo et al. | |
| 2017/0016208 | A1 | 1/2017 | Saitoh et al. | |

FOREIGN PATENT DOCUMENTS

| | | | |
|---|---|---|---|
| JP | S5754635 | A | 4/1982 |
| JP | 63-037216 | B2 | 7/1988 |
| JP | 2010-084888 | A | 4/2010 |
| JP | 2014205977 | A | 10/2014 |
| KR | 10-2003-0036186 | A | 5/2003 |
| KR | 10-2016-0101926 | A | 8/2016 |
| KR | 10-2017-0049462 | A | 5/2017 |

OTHER PUBLICATIONS

International Search Report for related International Application No. PCT/KR2021/002445; action dated Sep. 2, 2021; (5 pages).
Written Opinion for related International Application No. PCT/KR2021/002445; action dated Sep. 2, 2021; (5 pages).
Extended Search Report for related European Application No. 21761794.3; action dated Apr. 16, 2024; (9 pages).

* cited by examiner

- Prior Art -

CONSTRUCTION MACHINE

CROSS-REFERENCE TO RELATED APPLICATIONS

This application is the National Stage filing under 35 U.S.C. 371 of International Application No. PCT/KR2021/002445, filed on Feb. 26, 2021, which claims the benefit of earlier filing date and right of priority to Korea utility model Application No. 10-2020-0024504 filed on Feb. 27, 2020, the contents of which are all hereby incorporated by reference herein in their entirety.

FIELD

The disclosure relates to a construction machine and, more particularly, to a construction machine that uses a plurality of hydraulic pumps to drive various driving devices.

BACKGROUND

A construction machine generally refers to all machines used in public works, construction works, or industrial sites. Generally, the construction machine has an engine and a hydraulic pump that is operated by power of the engine, runs with power generated through the engine and the hydraulic pump, or drives various working devices.

For example, an excavator, which is a type of construction machine, performs work such as excavation work to dig into the ground in a civil engineering site, building, or construction site, loading work to transport soil, cracking work to demolish buildings, and grading work to clear the ground. To this end, the construction machine performs operations such as an excavation operation, a boom-up swing operation, a dump operation, and a work running operation. Further, the excavator that is the construction machine includes a lower running body for movement, an upper rotary body mounted on the lower running body to be rotated, and various working devices and a driver's seat installed on the upper rotary body.

Further, as shown in FIG. 1, in a conventional construction machine 10, two main pumps 31 and 32 supply working fluid. The working fluid supplied by the two main pumps 31 and 32 is distributed from a main control valve (MCV) 50 to each driving device. Here, the driving device is set to supply working fluid to each main pump 31 or 32.

To explain in detail with an example, the driving device includes a boom cylinder 71 for driving a boom, an arm cylinder 72 for driving an arm, a bucket cylinder 73 for driving a bucket, a rotation motor 75 for rotating the upper rotary body, and a first running motor 76 and a second running motor 77 for running.

Further, the main control valve 50 includes a first boom valve 51*a* for supplying working fluid discharged by the first main pump 31 to the boom cylinder 71, a first running valve 56 for supplying working fluid discharged by the first main pump 31 to the first running motor 76, a bucket valve 53 for supplying working fluid discharged by the first main pump 31 to the bucket cylinder 73, a rotation valve 55 for supplying working fluid discharged by the second main pump 32 to the rotation motor 75, a second running valve 57 for supplying working fluid discharged by the second main pump 32 to the second running motor 77, a first arm valve 52*a* for supplying working fluid discharged by the second main pump 32 to the arm cylinder 75, an option valve 59 for driving a device that is optionally mounted on the construction machine 10, a straight running valve 58 for supplying working fluid discharged by the first main pump 31 during straight running to the first running motor 76 as well as the second running motor 77, a second arm valve 52*b* for joining working fluid discharged by the first main pump 31 to the arm cylinder 72, and a second boom valve 51*b* for joining working fluid discharged by the second main pump 32 to the boom cylinder 71.

Meanwhile, among various driving devices, the boom cylinder 71 and the arm cylinder 72 require a relatively larger flow rate of working fluid compared to other driving devices depending on a load. Thus, although the first boom valve 51*a* of the main control valve 50 mainly supplies working fluid discharged by the first main pump 31 to the boom cylinder 71, the second boom valve 51*b* may complementarily supply working fluid discharged by the second main pump 32 to the boom cylinder 71. Further, although the first arm valve 52*a* of the main control valve 50 mainly supplies working fluid discharged by the second main pump 32 to the arm cylinder 72, the second arm valve 52*b* may complementarily supply working fluid discharged by the first main pump 31 to the arm cylinder 72.

As described above, in the conventional construction machine 10, either of the main pumps 31 and 32 may often supply working fluid to a plurality of driving devices. Further, the pressure of working fluid required for driving the driving device may be different for each driving device. When either of the main pumps 31 and 32 supplies working fluid to the plurality of driving devices, a lot of energy loss occurs in the driving device operating at a relatively low pressure. This is because the main pumps 31 and 32 are controlled to discharge working fluid depending on the driving device operating at the highest pressure among the plurality of driving devices that are supplied with working fluid. Therefore, working fluid with an excessively high pressure is supplied to the driving device driven at a relatively lower pressure.

For example, when the bucket cylinder 73 is operated at a low pressure and the arm cylinder 72 is operated at a high pressure, the first main pump 31 supplying the working fluid to the bucket cylinder 73 discharges the working fluid of a relatively low pressure depending on the working pressure of the bucket cylinder 73, and the second main pump 32 supplying the working fluid to the arm cylinder 72 discharges the working fluid of a relatively high pressure depending on the working pressure of the arm cylinder 72. Then, when the second arm valve 52*b* supplies working fluid, discharged from the first main pump 31, to the arm cylinder 72 so as to replenish the working fluid supplied to the arm cylinder 72, the pressure of the working fluid discharged from the first main pump 31 rises to the working pressure of the arm cylinder 72. Even if the bucket cylinder 73 to which the first main pump 31 supplies working fluid is operated at a lower pressure, the bucket cylinder is supplied with the working fluid of an excessively high pressure, thus causing a lot of energy loss.

SUMMARY

An embodiment of the present disclosure provides a construction machine capable of minimizing an energy loss when a plurality of driving devices are simultaneously operated.

In an aspect, a construction machine construction includes a boom cylinder driving a boom, a rotation motor rotating a rotary body, an arm cylinder driving an arm, a bucket cylinder driving a bucket, a first main pump supplying working fluid to the boom cylinder or recovering working fluid discharged from the boom cylinder, a second main pump supplying working fluid to the rotation motor or recovering working fluid discharged from the rotation motor, and a third main pump supplying working fluid to the arm cylinder or the bucket cylinder.

The construction machine may further include an engine connected to the first main pump, a first boom hydraulic line connecting a head side of the boom cylinder and the first main pump, and a second boom hydraulic line connecting a rod side of the boom cylinder and the first main pump. Further, the first main pump may be operated with the working fluid discharged from the boom cylinder when the boom is moved down, thus supplying energy to the engine.

The construction machine may further include an accumulator for accumulating the working fluid, a boom regenerative valve connected to the first boom hydraulic line and the second boom hydraulic line, and a boom regenerative line connecting the boom regenerative valve and the accumulator. Further, the first main pump may be operated with the working fluid supplied by the accumulator, thus supplying energy to the engine.

The construction machine may further include a first rotation hydraulic line connecting one side of the rotation motor and the second main pump, and a second rotation hydraulic line connecting the other side of the rotation motor and the second main pump. Further, the engine may be connected to the second main pump, and the second main pump may be operated with the working fluid discharged from the rotation motor when the rotation motor is decelerated, thus supplying energy to the engine.

The construction machine may further include an accumulator for accumulating the working fluid, a rotation regenerative valve connected to the first rotation hydraulic line and the second rotation hydraulic line, and a rotation regenerative line connecting the rotation regenerative valve and the accumulator. The second main pump may be operated with the working fluid supplied by the accumulator, thus supplying energy to the engine.

The first main pump may be a bidirectional pump that selectively discharges the working fluid to either of the first boom hydraulic line or the second boom hydraulic line, and the second main pump may be a bidirectional pump that selectively discharges the working fluid to either of the first rotation hydraulic line or the second rotation hydraulic line.

The construction machine may further include a drain tank storing the working fluid discharged from the arm cylinder and the bucket cylinder, and a drain line connecting the arm cylinder, the bucket cylinder, and the drain tank.

The construction machine may further include an engine connected to the first main pump, the second main pump, and the third main pump to provide power. Further, at least one of the first main pump and the second main pump may additionally supply energy to the engine during a regenerative operation.

Further, in the construction machine, when the boom, the bucket, and the arm are operated, the working fluid discharged from the first main pump may be supplied to the boom cylinder, the working fluid discharged from the second main pump may be supplied to the bucket cylinder instead of the rotation motor, and the working fluid discharged from the third main pump may be supplied to the arm cylinder.

The construction machine may further include a rotation valve controlling the working fluid supplied to the rotation motor, and a bucket hydraulic line for supplying the working fluid to the bucket cylinder. Further, the rotation valve may block the working fluid supplied by the second main pump to the rotation motor, and the working fluid discharged from the second main pump may be supplied through the bucket hydraulic line to the bucket cylinder.

In the construction machine, when the boom, the rotation motor, and the bucket are operated, the working fluid discharged from the first main pump may be supplied to the boom cylinder, the working fluid discharged from the second main pump may be supplied to the rotation motor, and the working fluid discharged from the third main pump may be supplied to the bucket cylinder instead of the arm cylinder.

The construction machine may further include an arm valve controlling the working fluid supplied to the arm cylinder, and an arm bucket joining line connected to the bucket cylinder. Further, the arm valve may block the working fluid supplied by the third main pump to the arm cylinder, and the working fluid discharged from the third main pump may be supplied through the arm bucket joining line to the bucket cylinder.

Further, in the construction machine, when the boom, the rotation motor, the arm, and the bucket are operated, the working fluid discharged from the first main pump may be supplied to the boom cylinder, the working fluid discharged from the second main pump may be supplied to the rotation motor, and the working fluid discharged from the third main pump may be supplied to the bucket cylinder along with the arm cylinder.

The construction machine may further include an arm valve controlling the working fluid supplied to the arm cylinder, and a bucket valve controlling the working fluid supplied to the bucket cylinder. Further, the arm valve and the bucket valve may supply the working fluid discharged from the third main pump to the arm cylinder and the bucket cylinder, respectively.

According to an embodiment of the present disclosure, a construction machine can minimize an energy loss when a plurality of driving devices are simultaneously operated.

Further, according to an embodiment of the present disclosure, a construction machine can improve energy utilization efficiency by recovering energy wasted from a driving device.

DETAILED DESCRIPTION

Figure 1:
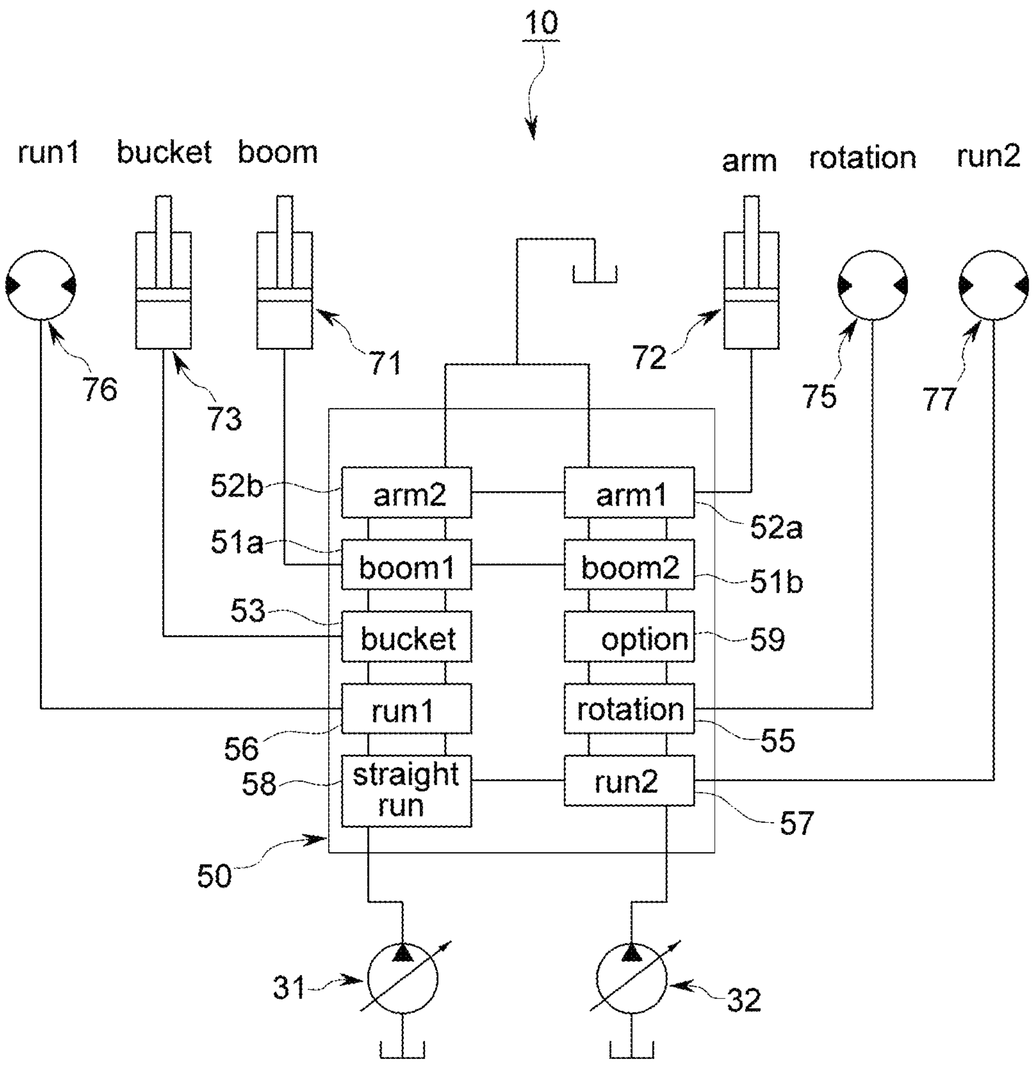
FIG. 1 is a hydraulic circuit diagram illustrating a conventional construction machine.

Hereinafter, embodiments of the present disclosure will be described in detail such that those skilled in the art can easily practice the present disclosure. However, the present disclosure may be implemented in various ways without being limited to particular embodiments described herein.

Furthermore, the same reference numerals are used throughout the drawings to designate the same or similar components.

It should be noted that the drawings are schematic and not shown to scale. The size or ratio of components shown in the drawings may be exaggerated for the clarity and convenience of description. Any size is merely illustrative but not restrictive. Like reference numerals refer to like parts throughout various figures and embodiments of the present disclosure.

An embodiment of the present disclosure will be described in detail in an idealized form. As a result, various changes of the drawings are expected. Thus, an embodiment is not limited to a specific shape of an illustrated area, and includes a change in shape by manufacturing, for example.

Hereinafter, a construction machine 101 according to a first embodiment of the present disclosure will be described with reference to FIG. 2.

Herein, an excavator will be described as an example of the construction machine 101. That is, the construction machine 101 may include a lower running body for movement, an upper rotary body mounted on the lower running body to be rotated, and a boom, an arm, and a bucket installed on the upper rotary body.

Figure 2:
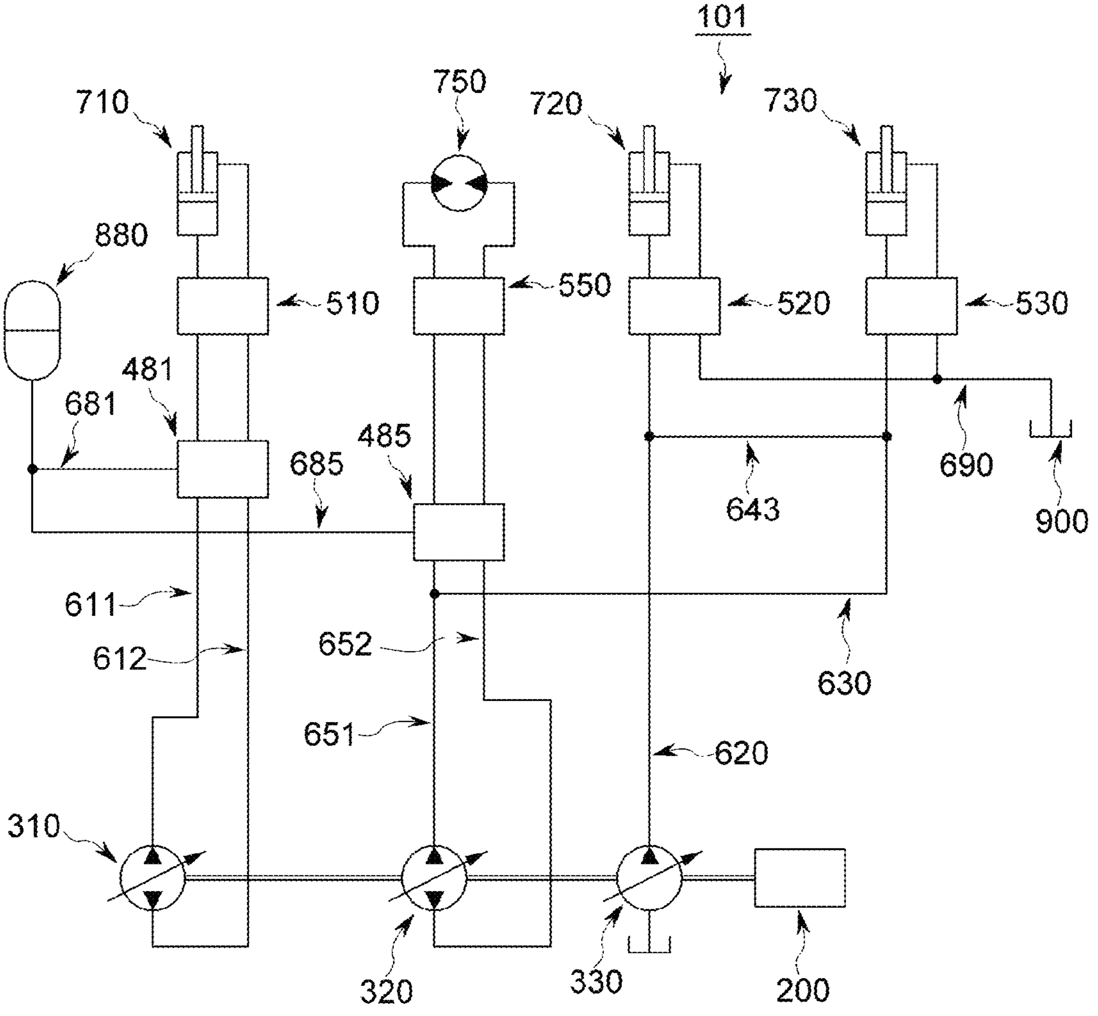
FIG. 2 is a hydraulic circuit diagram illustrating a construction machine according to an embodiment of the present disclosure.

As shown in FIG. 2, the construction machine 101 according to an embodiment of the present disclosure includes a boom cylinder 710, a rotation motor 750, an arm cylinder 720, a bucket cylinder 730, a first main pump 310, a second main pump 320, and a third main pump 330.

Furthermore, the construction machine 101 according to an embodiment of the present disclosure may further include a first boom hydraulic line 611, a second boom hydraulic line 612, a first rotation hydraulic line 651, a second rotation hydraulic line 652, an arm hydraulic line 620, a bucket hydraulic line 630, an arm bucket joining line 643, a boom valve 510, a rotation valve 550, an arm valve 520, a bucket valve 530, an accumulator 880, a boom regenerative valve 481, a boom regenerative line 681, a rotation regenerative valve 485, a rotation regenerative line 685, an engine 200, a drain tank 900, and a drain line 690.

Furthermore, although not shown in the drawings, the construction machine 101 may further include two running motors for running the lower running body.

The boom cylinder 710, the arm cylinder 720, and the bucket cylinder 730 drive the boom, the arm, and the bucket, respectively. That is, the boom cylinder 710, the arm cylinder 720, and the bucket cylinder 730 operate the working device of the construction machine 101. Furthermore, the boom cylinder 710, the arm cylinder 720, and the bucket cylinder 730 each include a head side and a rod side.

The rotation motor 750 rotates the upper rotary body mounted on the lower running body.

As described above, the boom cylinder 710, the arm cylinder 720, the bucket cylinder 730, and the rotation motor 750 are representative driving devices used in the construction machine 101.

The first main pump 310, the second main pump 320, and the third main pump 330 discharge working fluid for operating various driving devices. That is, the working fluid discharged from the first main pump 310, the second main pump 320, and the third main pump 330 is supplied through several valves to various driving devices. Furthermore, the first main pump 310, the second main pump 320, and the third main pump 330 may be variable capacity type pumps in which the flow rate of the discharged working fluid varies depending on the angle of a swash plate.

To be more specific, in an embodiment of the present disclosure, the first main pump 310 may basically supply working fluid to the boom cylinder 710. The second main pump 320 may basically supply working fluid to the rotation motor 750. Further, the third main pump 330 may basically supply working fluid to the arm cylinder 720 or the bucket cylinder 730.

Furthermore, if necessary, the second main pump 320 may supply working fluid to the bucket cylinder 730 instead of the rotation motor 750, and the third main pump 330 may supply working fluid to the arm cylinder 720, supply working fluid to the bucket cylinder 730 instead of the arm cylinder 720, or supply working fluid to both the arm cylinder 720 and the bucket cylinder 730.

Furthermore, the first main pump 310 and the second main pump 320 may be bidirectional pumps, and the third main pump 330 may be a unidirectional pump. However, an embodiment of the present disclosure is not limited thereto, and the first main pump 310 and the second main pump 320 may also be unidirectional pumps. When the first main pump 310 and the second main pump 320 are unidirectional pumps, the supply direction of working fluid supplied to the boom cylinder 710 and the rotation motor 750 may be switched through the boom valve 510 and the rotation valve 550 that will be described later.

The engine 200 is connected to the first main pump 310, the second main pump 320, and the third main pump 330 to provide power. The engine 200 generates power by burning fuel. For example, the engine 200 may be a diesel engine or be a liquefied natural gas (LNG) engine, a compressed natural gas (CNG) engine, an adsorption natural gas (ANG) engine, a liquefied petroleum gas (LPG) engine, or a gasoline engine. However, an embodiment of the present disclosure is not limited thereto, and another power device such as an electric motor may be used instead of the engine 200.

The first boom hydraulic line 611 may connect the head side of the boom cylinder 710 and the first main pump 310.

The second boom hydraulic line 612 may connect the rod side of the boom cylinder 720 and the first main pump 310.

Since the first main pump 310 is the bidirectional pump, the first main pump 310 may selectively discharge working fluid to either of the first boom hydraulic line 611 or the second boom hydraulic line 612. That is, if the first main pump 310 discharges working fluid to the first boom hydraulic line 611, the boom cylinder 710 is extended while the working fluid flows into the head side of the boom cylinder 710. In contrast, if the first main pump 310 discharges working fluid to the second boom hydraulic line 612, the boom cylinder 710 is contracted while the working fluid flows into the rod side of the boom cylinder 710. However, an embodiment of the present disclosure is not limited thereto. Even if the first main pump 310 discharges working fluid in the same direction, the operating direction of the boom cylinder 710 may be changed by switching the boom valve 510 that will be described later. As such, the first main pump 310 may basically supply working fluid to the boom cylinder 710.

The first rotation hydraulic line 651 connects one side of the rotation motor 750 and the second main pump 320.

The second rotation hydraulic line 652 connects the other side of the rotation motor 750 and the second main pump 320.

Since the second main pump 320 is the bidirectional pump, the second main pump 320 may selectively discharge working fluid to either of the first rotation hydraulic line 651 or the second rotation hydraulic line 652.

For example, if the second main pump 320 discharges working fluid to the first rotation hydraulic line 651, the working fluid is supplied through the first rotation hydraulic line 651 to the rotation motor 750. At this time, one side of the rotation motor 750 becomes an inlet port, the other side of the rotation motor 750 becomes an outlet port, and the rotation motor 750 rotates to the right. In contrast, if the second main pump 320 discharges working fluid to the second rotation hydraulic line 652, the working fluid is supplied through the second rotation hydraulic line 652 to the other side of the rotation motor 750. At this time, the other side of the rotation motor 750 becomes an inlet port, one side of the rotation motor 750 becomes an outlet port, and the rotation motor 750 rotates to the left.

However, an embodiment of the present disclosure is not limited thereto. Even if the second main pump 320 discharges working fluid in the same direction, the rotating direction of the rotation motor 750 may be changed by switching the rotation valve 550 that will be described later.

The bucket hydraulic line 630 is branched from the first rotation hydraulic line 651 and is connected to the bucket cylinder 730. Thus, the second main pump 320 basically supplies working fluid to the rotation motor 750. However, if necessary, working fluid may be selectively supplied to the bucket cylinder 730.

The arm hydraulic line 620 connects the head side of the arm cylinder 720 and the third main pump 330. Thus, the third main pump 330 may basically supply working fluid to the arm cylinder 720.

The arm bucket joining line 643 is branched from the arm hydraulic line 620 and is connected to the bucket hydraulic line 630. Thus, the third main pump 330 basically supplies working fluid to the arm cylinder 720. However, if necessary, working fluid may be selectively supplied to the bucket cylinder 730.

The boom valve 510 is connected to the first boom hydraulic line 651 and the second boom hydraulic line 652 to control working fluid supplied to the boom cylinder 710 and working fluid discharged from the boom cylinder 710. Furthermore, as described above, the operating direction of the boom cylinder 710 may be changed by switching the boom valve 510.

The rotation valve 550 is connected to the first rotation hydraulic line 651 and the second rotation hydraulic line 652 to control working fluid supplied to the rotation motor 750 and working fluid discharged from the rotation motor 750. Furthermore, as described above, the rotating direction of the rotation motor 750 may be changed by switching the rotation valve 550.

The arm valve 520 is connected to the arm hydraulic line 620 to control working fluid supplied through the arm hydraulic line 620 to the arm cylinder 720.

The bucket valve 530 is connected to the bucket hydraulic line 630 to control working fluid supplied through the bucket hydraulic line 630 to the bucket cylinder 730.

The drain tank 900 stores working fluid discharged from the arm cylinder 720 and the bucket cylinder 730.

The drain line 690 connects the arm cylinder 720 and the bucket cylinder 730 with the drain tank 900.

The accumulator 880 may accumulate working fluid discharged from at least one of the boom cylinder 710 and the rotation motor 750.

The boom regenerative valve 481 may be connected to the first boom hydraulic line 611 and the second boom hydraulic line 612. Further, the boom regenerative line 681 may connect the boom regenerative valve 481 and the accumulator 880.

Thus, the boom regenerative valve 481 may move working fluid discharged from the boom cylinder 710 to the accumulator 880, or move working fluid accumulated in the accumulator 880 to the first main pump 310. The first main pump 310 may be operated as a motor when supplied with working fluid from the accumulator 880. That is, the first main pump 310 may be both a bidirectional pump and a motor combined pump.

As such, the first main pump 310 may be operated by working fluid accumulated in the accumulator 880 to generate regeneration energy and thereby supply energy to the engine 200. That is, the first main pump 310 may be operated by high-pressure working fluid accumulated in the accumulator 880 to subsidiarily produce power and thereby reduce the fuel efficiency of the engine 200.

Meanwhile, the first main pump 310 may be directly operated by working fluid discharged from the boom cylinder 710 when the boom is moved down, thus supplying energy to the engine 200.

The rotation regenerative valve 485 is connected to the first rotation hydraulic line 651 and the second rotation hydraulic line 652. Further, the rotation regenerative line 685 may connect the rotation regenerative valve 485 and the accumulator 880.

Thus, the rotation regenerative valve 485 may move working fluid discharged from the rotation motor 750 to the accumulator 880, or may move working fluid accumulated in the accumulator 880 to the second main pump 320. Likewise, the second main pump 320 may be operated as a motor when supplied with working fluid from the accumulator 880. That is, the second main pump 320 may be both a bidirectional pump and a motor combined pump.

As such, the second main pump 320 may be operated by working fluid accumulated in the accumulator 880 to generate regeneration energy and thereby supply energy to the engine 200. That is, the second main pump 320 may be operated by high-pressure working fluid accumulated in the accumulator 880 to subsidiarily produce power and thereby reduce the fuel efficiency of the engine 200.

Meanwhile, the second main pump 320 may be operated by working fluid discharged from the rotation motor 750 when the rotation motor 750 is decelerated, thus supplying energy to the engine 200.

Such a configuration enables the construction machine 101 according to an embodiment of the present disclosure to minimize an energy loss when a plurality of driving devices are simultaneously operated.

Furthermore, the construction machine 101 according to an embodiment of the present disclosure may recover energy wasted from the driving device, thus improving energy utilization efficiency.

Hereinafter, the operation of the construction machine 101 according to an embodiment of the present disclosure will be described in detail with reference to FIGS. 3 to 11.

The construction machine 101 according to an embodiment of the present disclosure may be operated in one of an excavation operation, a boom-up swing operation, a dump operation, and a work running operation. However, the above-described operations are merely illustrative to explain the operation of the construction machine 101, and the construction machine 101 may perform various operations other than the above-mentioned operation.

Figure 3:
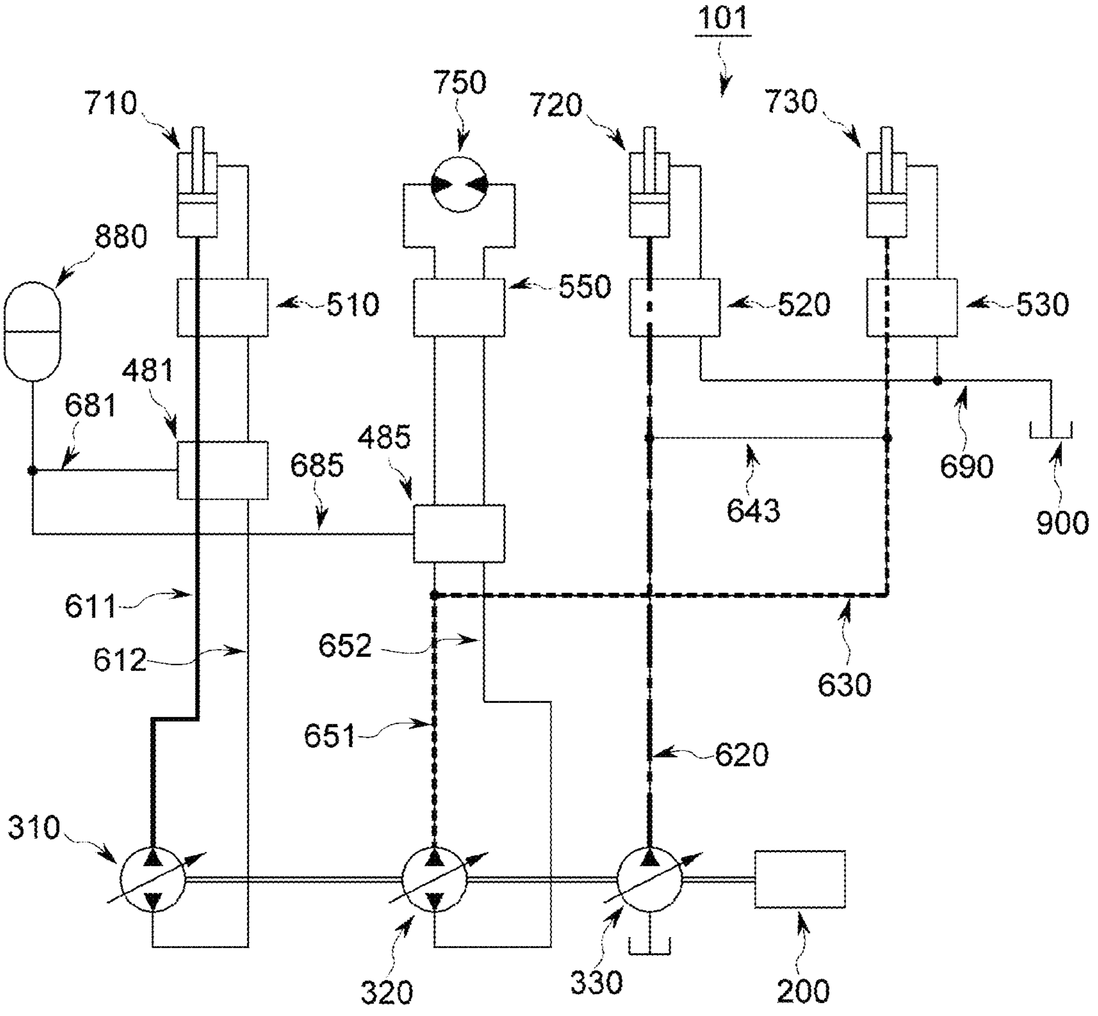
FIGS. 3 to 11 are hydraulic circuit diagrams and graphs illustrating the operation state of the construction machine of FIG. 1.

First, the excavation operation of the construction machine 101 according to an embodiment of the present disclosure will be described with reference to FIG. 3.

In the excavation operation, the boom, the bucket, and the arm are operated. That is, when the boom, the bucket, and the arm are operated, working fluid discharged from the first main pump 310 is supplied to the boom cylinder 710, working fluid discharged from the second main pump 320 is supplied to the bucket cylinder 730 instead of the rotation motor 750, and working fluid discharged from the third main pump 330 is supplied to the arm cylinder 720.

To be more specific, the working fluid discharged from the first main pump 310 moves along the first boom hydraulic line 611 to be supplied through the boom valve 510 to the boom cylinder 710. The working fluid discharged from the second main pump 320 moves along the bucket hydraulic line 630 to be supplied through the bucket valve 530 to the bucket cylinder 730. Further, the rotation valve 550 blocks the working fluid supplied by the second main pump 320 to the rotation motor 750. The working fluid discharged from the third main pump 330 moves along the arm hydraulic line 620 to be supplied through the arm valve 530 to the arm cylinder 730.

Moreover, the first main pump 310 discharges working fluid according to an operation amount by which a user operates an operation device (not shown), the second main pump 320 discharges working fluid according to the required flow rate of the bucket cylinder 730, and the third main pump 330 discharges working fluid according to the required flow rate of the arm cylinder 720.

As such, since each of the first main pump 310, the second main pump 320, and the third main pump 330 supplies working fluid to one driving device, the working fluid is not supplied to each driving device at an excessive pressure, thus minimizing the waste of energy.

When comparing the excavation operation of the conventional construction machine 10 as shown in FIG. 1 with that of the embodiment of the present disclosure, in the construction machine 10 of FIG. 1, the first main pump 31 supplies the working fluid to the boom cylinder 71 and the bucket cylinder 73, and the second main pump 32 supplies working fluid to the arm 72 during the excavation operation.

Further, when the arm 72 requires a large flow rate of working fluid, the second arm valve 52*b* is operated to replenish the arm cylinder 72 with the working fluid of the first main pump 31.

Figure 4:
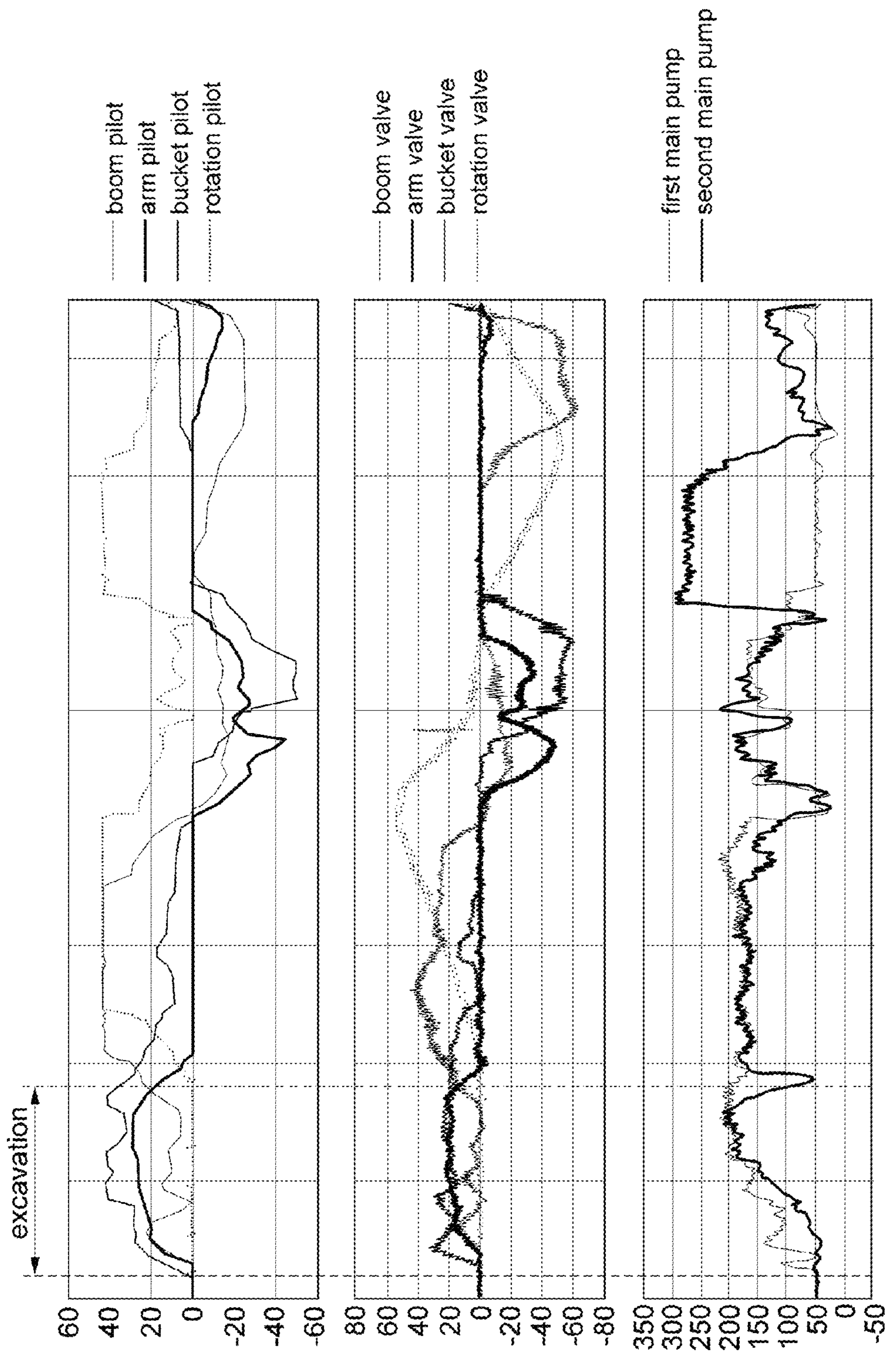

Referring to FIG. 4, it can be seen that the boom cylinder 71, the arm cylinder 72, and the bucket cylinder 73 are mainly used during the excavation operation of the conventional construction machine 10 shown in FIG. 1. In FIG. 4, a boom pilot, an arm pilot, a bucket pilot, and a rotation pilot mean signal pressure for driving or rotating the boom, the arm, and the bucket, respectively. Further, the pressure of each of the boom valve, the arm valve, the bucket valve, and the rotation valve may be the pressure of working fluid supplied to each of the boom cylinder 71, the arm cylinder 72, the bucket cylinder 73, and the rotation motor 75.

Since the operation speed of each driving device is controlled by the opening area of each valve, the working-fluid discharge pressure of the first main pump 31 and the second main pump 32 is determined based on the driving device that requires the highest working pressure during excavation.

Furthermore, it can be seen from FIG. 4 that the bucket cylinder 73 requires the highest working pressure. Thus, the first main pump 31 supplying working fluid to the bucket cylinder 73 discharges working fluid based on the working pressure of the bucket cylinder 73.

Figure 5:
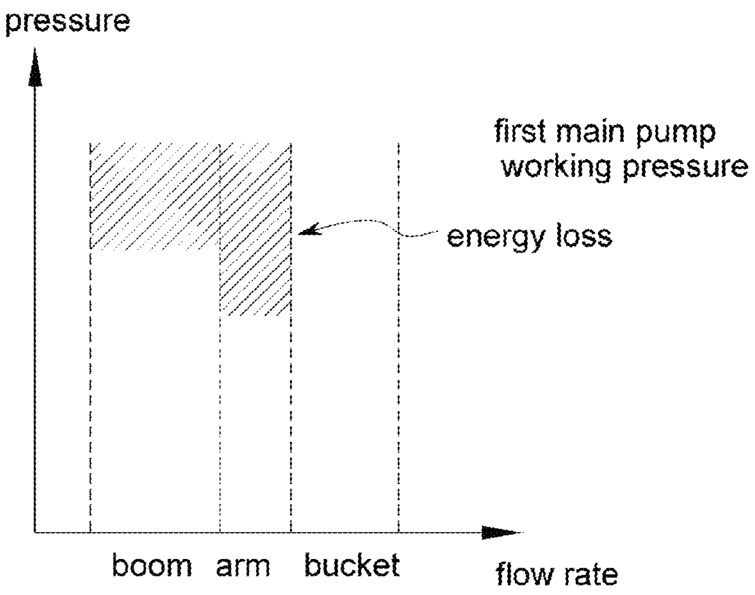

At this time, a loss occurs in proportion to a hatched area in the graph of FIG. 5 in the first boom valve 51*a* and the first arm valve 52*a* supplying working fluid to the boom cylinder 71 and the arm cylinder 72 that are supplied with working fluid along with the bucket cylinder 73 from the first main pump 31 but are relatively low in working pressure.

However, in the construction machine 101 according to an embodiment of the present disclosure, the first main pump 310, the second main pump 320, and the third main pump 330 supply working fluid to the boom cylinder 710, the bucket cylinder 720, and the arm cylinder 730, respectively, during excavation, thus minimizing the above-described energy loss.

Figure 6:
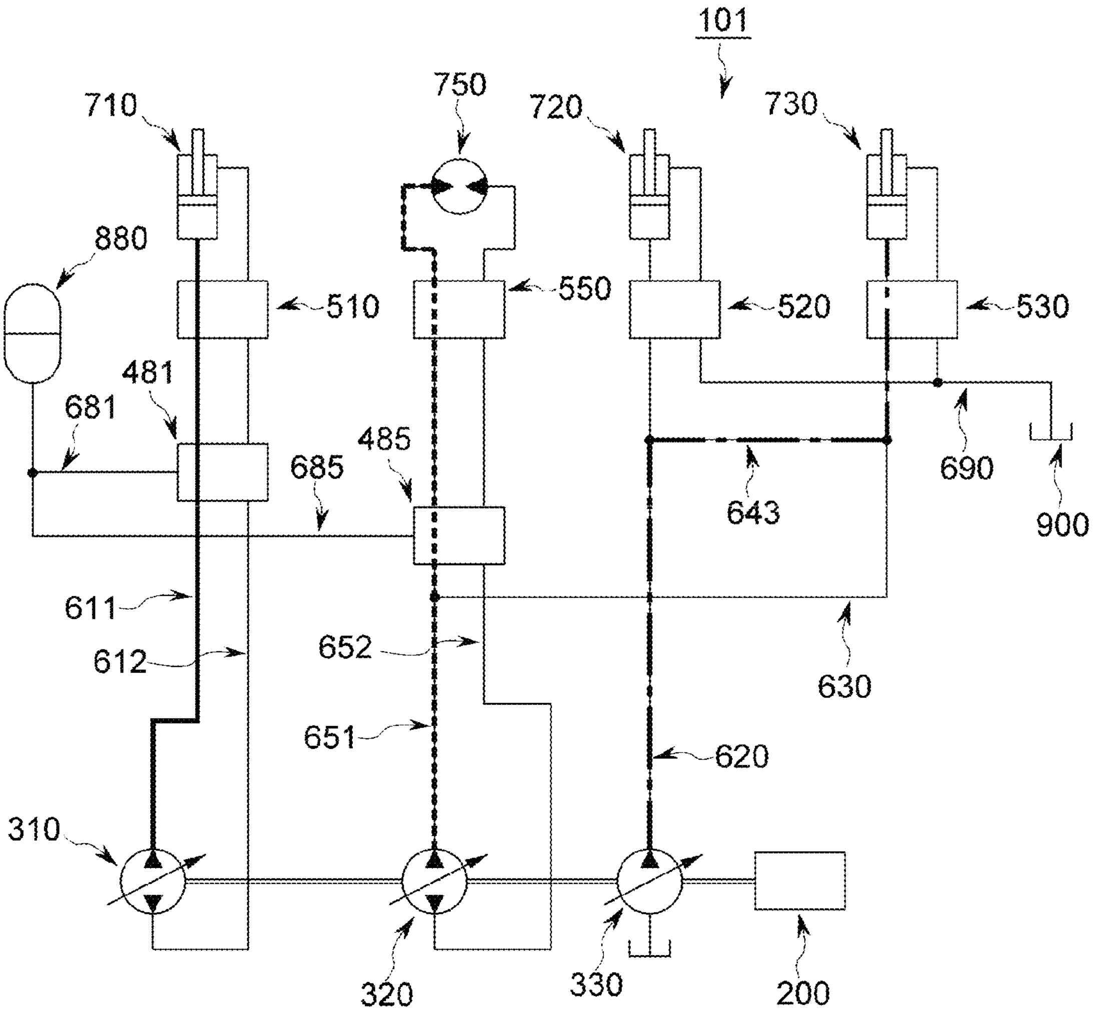

Next, the boom-up swing operation of the construction machine 101 according to an embodiment of the present disclosure will be described with reference to FIG. 6.

In the boom-up swing operation, the boom, the rotation motor 750, and the bucket are operated. That is, when the boom, the rotation motor 750, and the bucket are operated, working fluid discharged from the first main pump 310 is supplied to the boom cylinder 710, working fluid discharged from the second main pump 320 is supplied to the rotation motor 750, and working fluid discharged from the third main pump 330 is supplied to the bucket cylinder 730 instead of the arm cylinder 720.

To be more specific, the working fluid discharged from the first main pump 310 is moved along the first boom hydraulic line 611 to be supplied through the boom valve 510 to the boom cylinder 710. The working fluid discharged from the second main pump 320 is moved along the first rotation hydraulic line 651 to be supplied through the rotation valve 550 to the rotation motor 750. Meanwhile, the working fluid discharged from the second main pump 320 according to the rotating direction of the rotation motor 750 may be moved along the second rotation hydraulic line 652 to be supplied through the rotation valve 550 to the rotation motor 750. The working fluid discharged from the third main pump 330 is moved along the arm bucket joining line 643 and the bucket hydraulic line 630 to be supplied through the bucket valve 530 to the bucket cylinder 730. Further, the arm valve 520 blocks the working fluid supplied by the third main pump 330 to the arm cylinder 720.

Moreover, the first main pump 310 discharges working fluid according to an operation amount by which a user operates an operation device (not shown), the second main pump 320 discharges working fluid according to the required flow rate of the rotation motor 750, and the third main pump 330 discharges working fluid according to the required flow rate of the bucket cylinder 730.

As such, since each of the first main pump 310, the second main pump 320, and the third main pump 330 basically supplies working fluid to one driving device, the working fluid is not supplied to each driving device at an excessive pressure, thus minimizing the waste of energy.

When comparing the boom-up swing operation of the conventional construction machine 10 as shown in FIG. 1 with that of the embodiment of the present disclosure, in the construction machine 10 of FIG. 1, the first main pump 31 supplies the working fluid to the boom cylinder 71 and the bucket cylinder 73, and the second main pump 32 supplies working fluid to the rotation motor 75 during the boom-up swing operation. Simultaneously, the second boom valve 51*b* is operated, so that the second main pump 32 additionally supplies working fluid to the boom cylinder 71.

Figure 7:
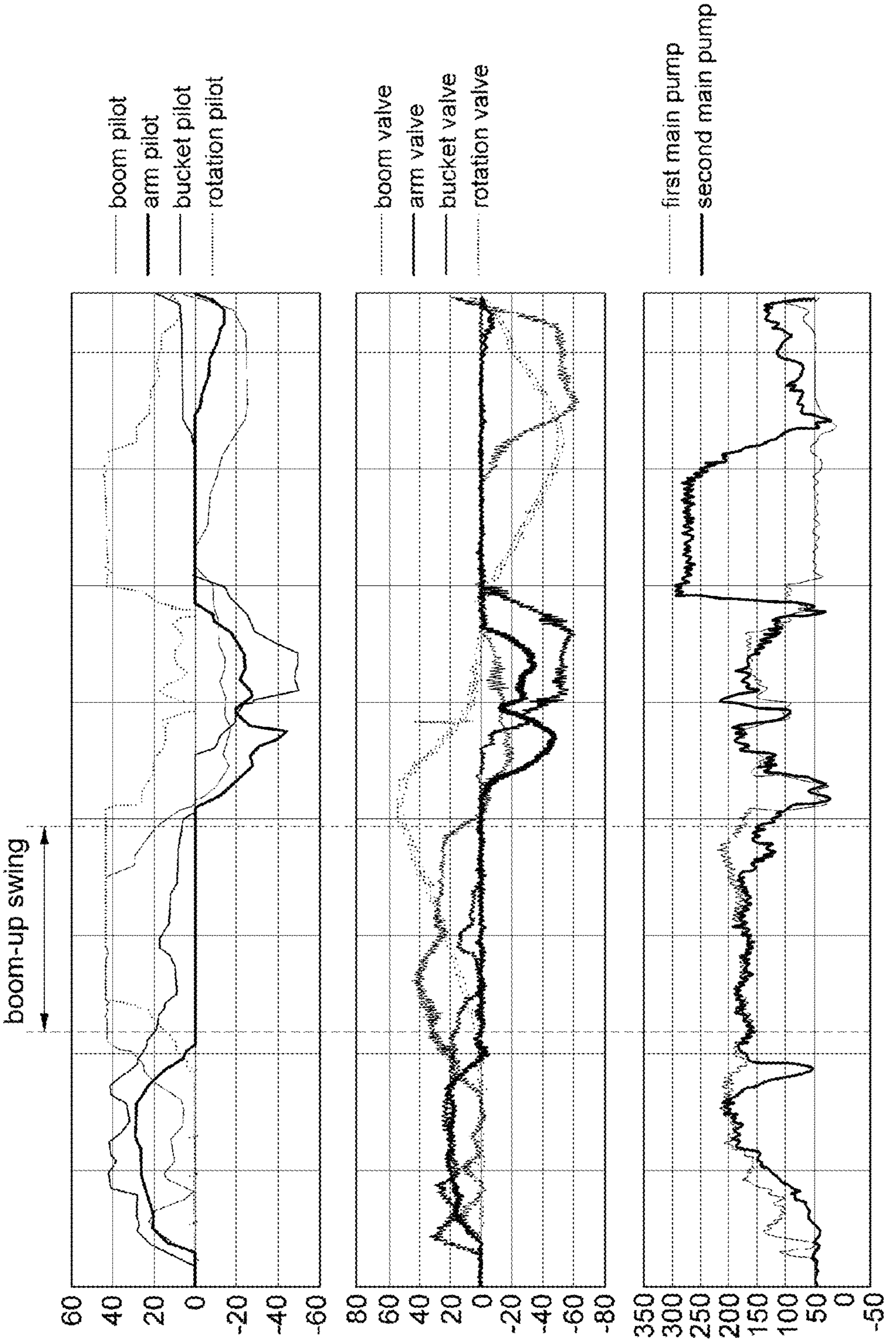

Referring to FIG. 7, it can be seen that the boom cylinder 71, the bucket cylinder 73, and the rotation motor 75 are mainly used during the boom-up swing operation of the conventional construction machine 10 shown in FIG. 1.

Since the operation speed of each driving device is controlled by the opening area of each valve, the working-fluid discharge pressure of the first main pump 31 and the second main pump 32 is determined based on the driving device that requires the highest working pressure during boom-up swing operation.

Furthermore, it can be seen from FIG. 7 that the rotation motor 75 requires the highest working pressure. Thus, the second main pump 32 supplying working fluid to the rotation motor 75 discharges working fluid based on the working pressure of the rotation motor 75.

Figure 8:
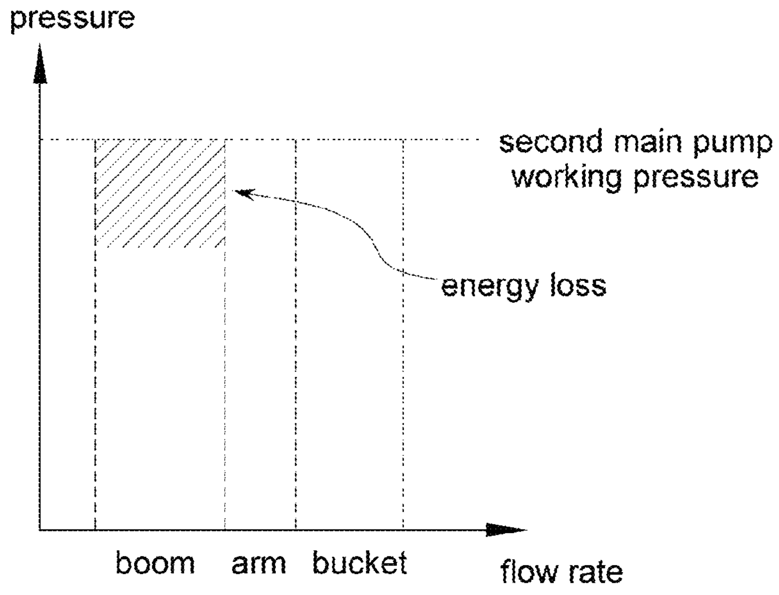

At this time, a loss occurs in proportion to a hatched area in the graph of FIG. 8 in the first boom valve 51*a* supplying working fluid to the boom cylinder 71 that is supplied with working fluid along with the rotation motor 75 from the second main pump 31 but is relatively low in working pressure.

However, in the boom-up swing operation of the construction machine 101 according to an embodiment of the present disclosure, the first main pump 310 discharges working fluid according to an operation amount by which a user operates an operation device (not shown), the second main pump 320 discharges working fluid according to the required flow rate of the rotation motor 750, and the third main pump 330 discharges working fluid according to the required flow rate of the bucket cylinder 730, thus minimizing the above-described energy loss.

Figure 9:
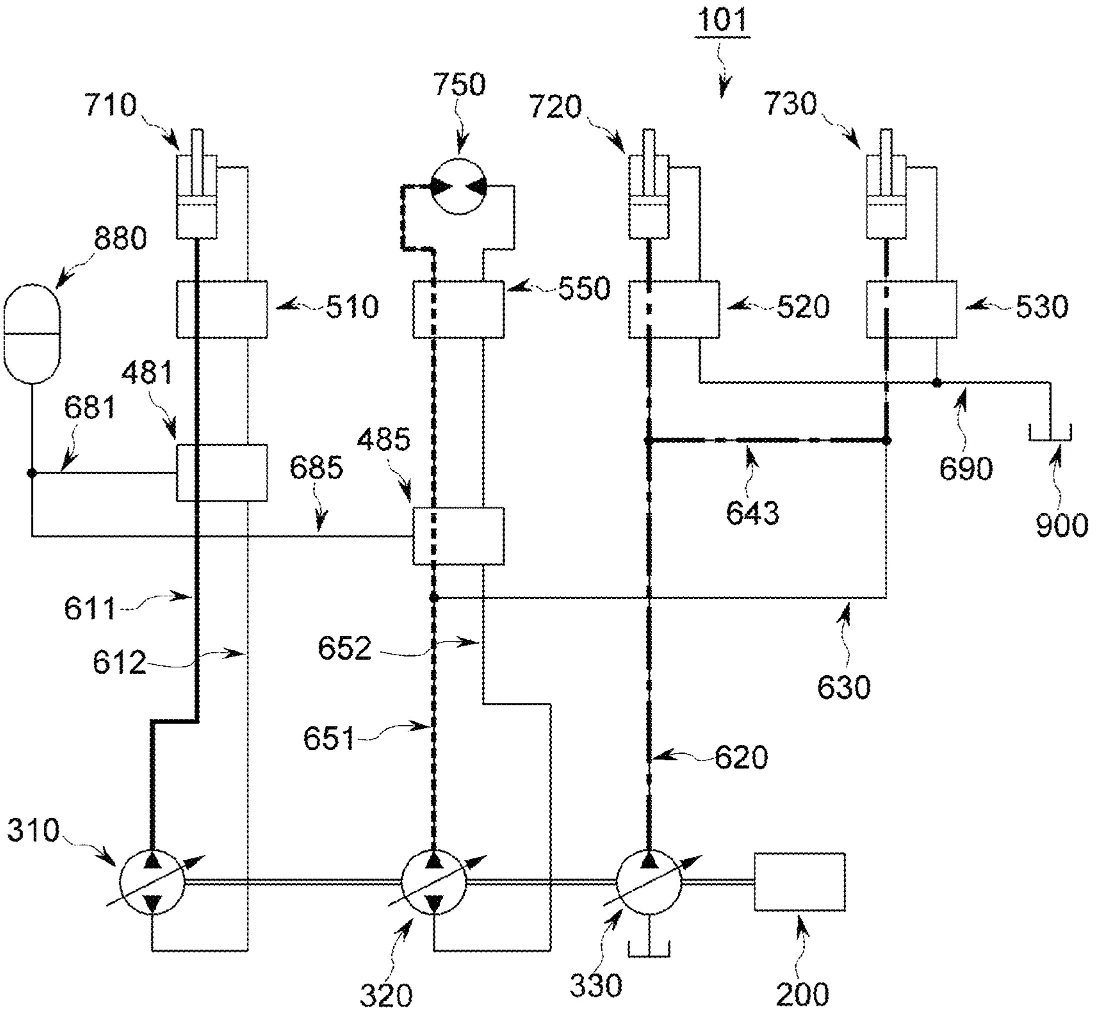

Next, the dump operation of the construction machine according to an embodiment of the present disclosure will be described with reference to FIG. 9.

In the dump operation, the boom, the rotation motor 750, the arm, and the bucket are operated. In the dump operation, energy is regenerated using the inertial energy of rotation and the boom. That is, the first main pump 310 and the second main pump 320 may be operated with the working fluid discharged from the boom cylinder 710 and the rotation motor 750 to generate regeneration energy. In this case, during the operation of the boom, the rotation motor 750, the arm, and the bucket, the first main pump 310 controls the speed of the boom, and controls a rotation speed in the second main pump 320, and working fluid discharged from the third main pump 330 is supplied to the arm cylinder 710 and the bucket cylinder 730. Furthermore, the working fluid discharged from the third main pump 330 is supplied along the arm hydraulic line 620 through the arm valve 520 to the arm cylinder 720, and is moved along the arm bucket joining line 643 and the bucket hydraulic line 630 to be supplied through the bucket valve 530 to the bucket cylinder 730.

The first main pump 310 controls the angle of the swash plate so as to control the speed of the boom cylinder 710 according to the operation amount by which a user operates the operation device (not shown), the second main pump 320 controls the angle of the swash plate so as to control the rotation speed of the rotation motor 750 according to the operation amount by which a user operates the operation device, and the third main pump 330 discharges working fluid according to the required flow rate of the boom cylinder 710 and the required flow rate of the bucket cylinder 730.

As such, the first main pump 310 and the second main pump 320 may recover the energy of the boom and rotation, thus improving energy efficiency.

When comparing the dump operation of the conventional construction machine 10 as shown in FIG. 1 with that of the embodiment of the present disclosure, during the dump operation of the construction machine 10 of FIG. 1, the first main pump 31 supplies the working fluid to the boom cylinder 71 and the bucket cylinder 73, and the second main pump 32 supplies working fluid to the arm cylinder 72 and the rotation motor 75.

Figure 10:
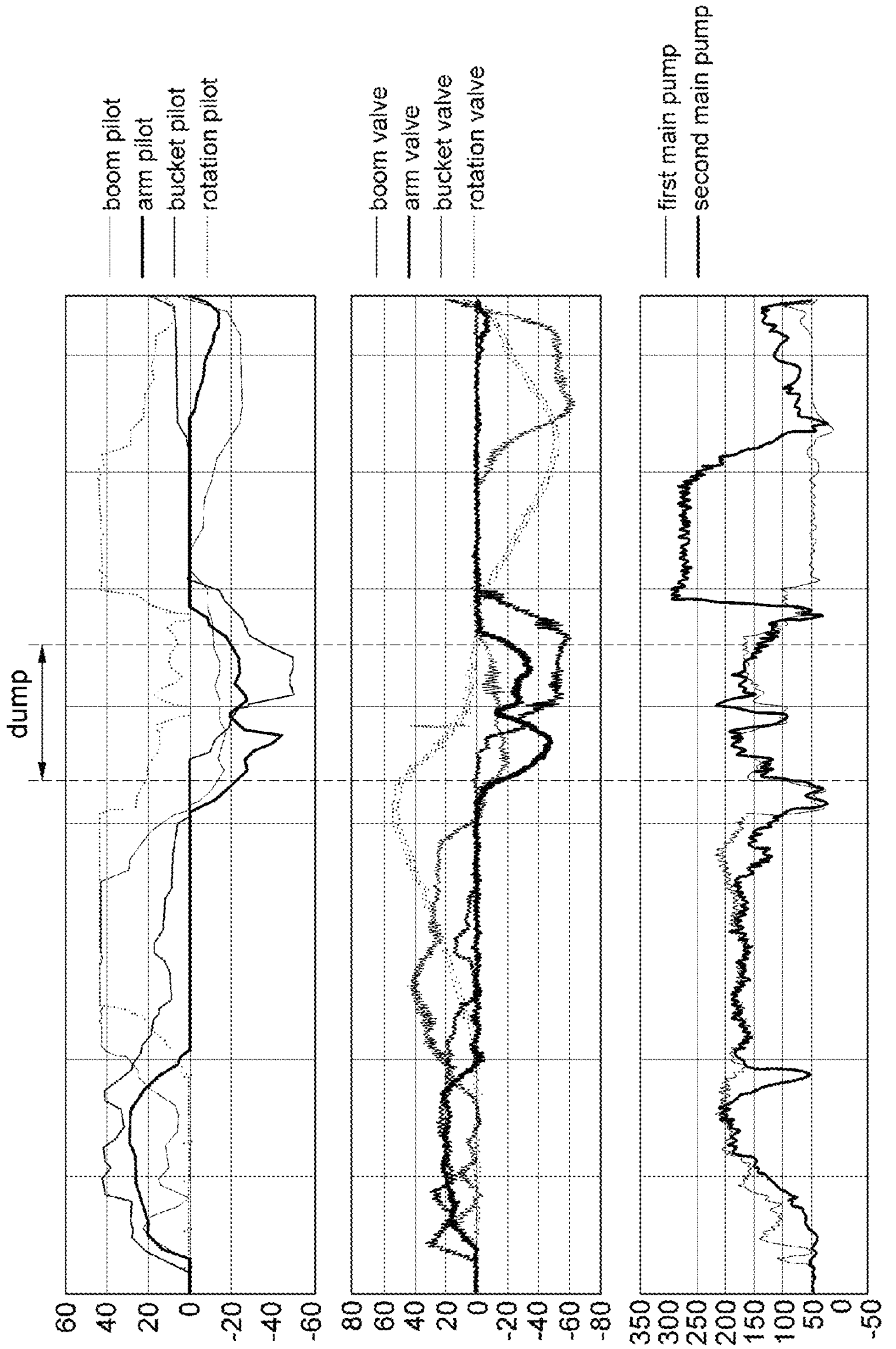
Figure 11:
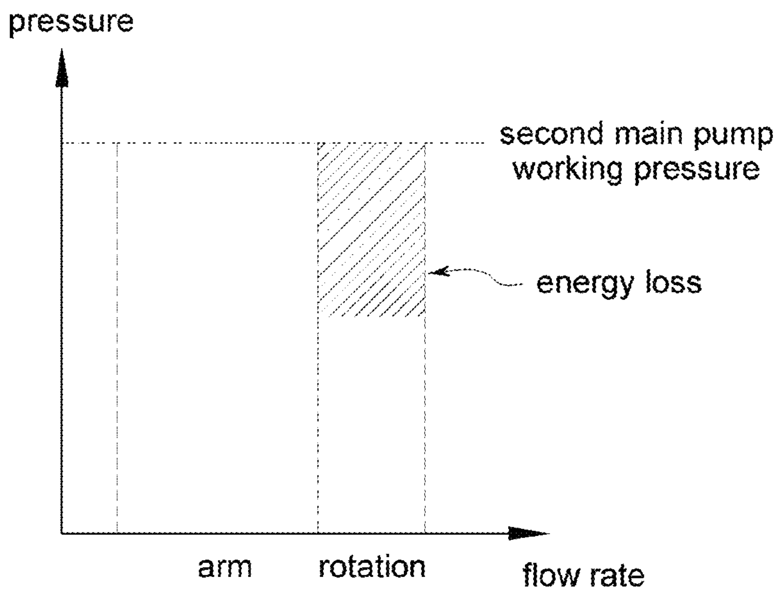

Referring to FIG. 10, it can be seen that a relatively high working pressure is required in the rotation motor 75 and the boom cylinder 71 and a relatively low working pressure is required in the arm cylinder 72 and the bucket cylinder 73 during the dump operation of the conventional construction machine 10 shown in FIG. 1. That is, a deviation between the working pressure of the boom cylinder 71 supplied with working fluid from the first main pump 31 and the working pressure of the bucket cylinder 73 is relatively large, and a deviation between the working pressure of the rotation motor 75 supplied with working fluid from the second main pump 32 and the working pressure of the arm cylinder 72 is also relatively large.

Since the operation speed of each driving device is controlled by the opening area of each valve, the first main pump 31 discharges working fluid based on the working pressure of the boom cylinder 71 having a high working pressure among the boom cylinder 71 and the bucket cylinder 73 during the dump operation. Therefore, an energy loss occurs in the bucket valve 53 that supplies working fluid to the bucket cylinder 73 having a relatively low working pressure. In addition, the second main pump 32 discharges working fluid based on the working pressure of the rotation motor 75 having a high working pressure among the rotation motor 75 and the arm cylinder 72 during the dump operation. Therefore, an energy loss occurs in the first arm valve 52*a* that supplies working fluid to the arm cylinder 72 having a relatively low working pressure. In this case, a loss occurs in proportion to a hatched area in the graph of FIG. 11 in the first arm valve 52*a* that supplies working fluid discharged from the second main pump 32 to the arm cylinder 72. Further, regeneration energy that is generated during the boom and rotating process is converted into heat in the valve and then is dissipated.

However, during the dump operation of the construction machine 101 according to an embodiment of the present disclosure, the first main pump 310 and the second main pump 320 recover energy during the boom and rotation, and the third main pump 330 discharges working fluid according to the required flow rate of the arm cylinder 720 and the required flow rate of the bucket cylinder 730, thus minimizing the above-described energy loss.

As described above, the construction machine 101 according to an embodiment of the present disclosure uses three main pumps 310, 320, and 330, thus minimizing the energy loss when a plurality of driving devices are simultaneously operated.

Although the present disclosure was described with reference to embodiments shown in the drawings, it is apparent to those skilled in the art that the present disclosure may be changed and modified in various ways without departing from the spirit or essential characteristics of the present disclosure.

It should be understood that the above-described embodiment is illustrative and not restrictive, the scope of the present disclosure is defined by the appended claims rather than by the description preceding them, and all changes that fall within the meaning and bound of the claims, or equivalence of such meaning and bound are intended to be embraced by the claims.

DETAILED DESCRIPTION OF MAIN ELEMENTS

101: construction machine
200: engine
310: first main pump
320: second main pump
330: third main pump
481: boom regenerative valve
485: rotation regenerative valve
510: boom valve
520: arm valve
530: bucket valve

550: rotation valve
611: first boom hydraulic line
612: second boom hydraulic line
620: arm hydraulic line
630: bucket hydraulic line
643: arm bucket joining line
651: first rotation hydraulic line
652: second rotation hydraulic line
681: boom regenerative line
685: rotation regenerative line
690: drain line
710: boom cylinder
720: arm cylinder
730: bucket cylinder
750: rotation motor
880: accumulator A construction machine according to an embodiment of the present disclosure can be used to minimize an energy loss when a plurality of driving devices are simultaneously operated.

Further, a construction machine according to an embodiment of the present disclosure can be used to improve energy utilization efficiency by recovering energy wasted from a driving device.

What is claimed is:

1. A construction machine comprising:
a boom cylinder driving a boom;
a rotation motor rotating a rotary body;
an arm cylinder driving an arm;
a bucket cylinder driving a bucket;
a first main pump supplying working fluid to the boom cylinder or recovering working fluid discharged from the boom cylinder;
a second main pump supplying working fluid to the rotation motor or recovering working fluid discharged from the rotation motor, and selectively supplies working fluid to the bucket cylinder, but does not supply working fluid to the boom cylinder; and
a third main pump which is a one-way pump that selectively supplies working fluid to at least one of the arm cylinder and the bucket cylinder, but does not recover working fluid discharged from the at least one of the arm cylinder and the bucket cylinder;
an engine connected to the first main pump;
a first boom hydraulic line connecting a head side of the boom cylinder and the first main pump;
a second boom hydraulic line connecting a rod side of the boom cylinder and the first main pump;
an accumulator for accumulating the working fluid;
a boom regenerative valve connected to the first boom hydraulic line and the second boom hydraulic line; and
a boom regenerative line connecting the boom regenerative valve and the accumulator,
wherein the first main pump is operated with the working fluid discharged from the boom cylinder when the boom is moved down, thus supplying energy to the engine; and
wherein the first main pump is operated with the working fluid supplied by the accumulator, thus supplying energy to the engine.

2. The construction machine of claim 1, further comprising:
a first rotation hydraulic line connecting one side of the rotation motor and the second main pump; and
a second rotation hydraulic line connecting the other side of the rotation motor and the second main pump,
wherein the engine is connected to the second main pump, and
wherein the second main pump is operated with the working fluid discharged from the rotation motor when the rotation motor is decelerated, thus supplying energy to the engine.

3. The construction machine of claim 2, further comprising:
an accumulator for accumulating the working fluid;
a rotation regenerative valve connected to the first rotation hydraulic line and the second rotation hydraulic line; and
a rotation regenerative line connecting the rotation regenerative valve and the accumulator,
wherein the second main pump is operated with the working fluid supplied by the accumulator, thus supplying energy to the engine.

4. The construction machine of claim 2, wherein the first main pump is a bidirectional pump that selectively discharges the working fluid to either of the first boom hydraulic line or the second boom hydraulic line, and
the second main pump is a bidirectional pump that selectively discharges the working fluid to either of the first rotation hydraulic line or the second rotation hydraulic line.

5. A construction machine comprising:
a boom cylinder driving a boom;
a rotation motor rotating a rotary body;
an arm cylinder driving an arm;
a bucket cylinder driving a bucket;
a first main pump supplying working fluid to the boom cylinder or recovering working fluid discharged from the boom cylinder;
a second main pump supplying working fluid to the rotation motor or recovering working fluid discharged from the rotation motor, and selectively supplies working fluid to the bucket cylinder, but does not supply working fluid to the boom cylinder;
a third main pump which is a one-way pump that selectively supplies working fluid to at least one of the arm cylinder and the bucket cylinder, but does not recover working fluid discharged from the at least one of the arm cylinder and the bucket cylinder;
a drain tank storing the working fluid discharged from the arm cylinder and the bucket cylinder; and
a drain line connecting the arm cylinder, the bucket cylinder, and the drain tank.

6. A construction machine comprising:
a boom cylinder driving a boom;
a rotation motor rotating a rotary body;
an arm cylinder driving an arm;
a bucket cylinder driving a bucket;
a first main pump supplying working fluid to the boom cylinder or recovering working fluid discharged from the boom cylinder;
a second main pump supplying working fluid to the rotation motor or recovering working fluid discharged from the rotation motor, and selectively supplies working fluid to the bucket cylinder, but does not supply working fluid to the boom cylinder;
a third main pump which is a one-way pump that selectively supplies working fluid to at least one of the arm cylinder and the bucket cylinder, but does not recover working fluid discharged from the at least one of the arm cylinder and the bucket cylinder; and
an engine connected to the first main pump, the second main pump, and the third main pump to provide power, wherein at least one of the first main pump and the second main pump additionally supplies energy to the engine during a regenerative operation.

7. A construction machine comprising:

a boom cylinder driving a boom;

a rotation motor rotating a rotary body;

an arm cylinder driving an arm;

a bucket cylinder driving a bucket;

a first main pump supplying working fluid to the boom cylinder or recovering working fluid discharged from the boom cylinder;

a second main pump supplying working fluid to the rotation motor or recovering working fluid discharged from the rotation motor, and selectively supplies working fluid to the bucket cylinder, but does not supply working fluid to the boom cylinder; and a third main pump which is a one-way pump that selectively supplies working fluid to at least one of the arm cylinder and the bucket cylinder, but does not recover working fluid discharged from the at least one of the arm cylinder and the bucket cylinder;

wherein, when the boom, the bucket, and the arm are operated, the working fluid discharged from the first main pump is supplied to the boom cylinder, the working fluid discharged from the second main pump is supplied to the bucket cylinder instead of the rotation motor, and the working fluid discharged from the third main pump is supplied to the arm cylinder.

8. The construction machine of claim 7, further comprising:

a rotation valve controlling the working fluid supplied to the rotation motor; and a bucket hydraulic line for supplying the working fluid to the bucket cylinder, wherein the rotation valve blocks the working fluid supplied by the second main pump to the rotation motor, and the working fluid discharged from the second main pump is supplied through the bucket hydraulic line to the bucket cylinder.

9. A construction machine comprising:

a boom cylinder driving a boom;

a rotation motor rotating a rotary body;

an arm cylinder driving an arm;

a bucket cylinder driving a bucket;

a first main pump supplying working fluid to the boom cylinder or recovering working fluid discharged from the boom cylinder;

a second main pump supplying working fluid to the rotation motor or recovering working fluid discharged from the rotation motor, and selectively supplies working fluid to the bucket cylinder, but does not supply working fluid to the boom cylinder; and a third main pump which is a one-way pump that selectively supplies working fluid to at least one of the arm cylinder and the bucket cylinder, but does not recover working fluid discharged from the at least one of the arm cylinder and the bucket cylinder;

an arm valve controlling the working fluid supplied to the arm cylinder; and an arm bucket joining line connected to the bucket cylinder, wherein, when the boom, the rotation motor, and the bucket are operated, the working fluid discharged from the first main pump is supplied to the boom cylinder, the working fluid discharged from the second main pump is supplied to the rotation motor, the working fluid discharged from the third main pump is supplied to the bucket cylinder instead of the arm cylinder, and wherein the arm valve blocks the working fluid supplied by the third main pump to the arm cylinder, and the working fluid discharged from the third main pump is supplied through the arm bucket joining line to the bucket cylinder.

10. A construction machine comprising:

a boom cylinder driving a boom;

a rotation motor rotating a rotary body;

an arm cylinder driving an arm;

a bucket cylinder driving a bucket;

a first main pump supplying working fluid to the boom cylinder or recovering working fluid discharged from the boom cylinder;

a second main pump supplying working fluid to the rotation motor or recovering working fluid discharged from the rotation motor, and selectively supplies working fluid to the bucket cylinder, but does not supply working fluid to the boom cylinder; and a third main pump which is a one-way pump that selectively supplies working fluid to at least one of the arm cylinder and the bucket cylinder, but does not recover working fluid discharged from the at least one of the arm cylinder and the bucket cylinder, wherein, when the boom, the rotation motor, the arm, and the bucket are operated, the working fluid discharged from the first main pump is supplied to the boom cylinder, the working fluid discharged from the second main pump is supplied to the rotation motor, and the working fluid discharged from the third main pump is supplied to the bucket cylinder along with the arm cylinder.

11. The construction machine of claim 10, further comprising:

an arm valve controlling the working fluid supplied to the arm cylinder; and a bucket valve controlling the working fluid supplied to the bucket cylinder, wherein the arm valve and the bucket valve supply the working fluid discharged from the third main pump to the arm cylinder and the bucket cylinder, respectively.

* * * * *